(12) United States Patent
De Roma Leao

(10) Patent No.: US 11,963,639 B2
(45) Date of Patent: Apr. 23, 2024

(54) MOKA POT WITH PIVOTABLE HANDLE

(71) Applicant: BRADSHAW HOME, Rancho Cucamonga, CA (US)

(72) Inventor: Flavio De Roma Leao, Upland, CA (US)

(73) Assignee: BRADSHAW HOME, Rancho Cucamonga, CA (US)

( * ) Notice: Subject to any disclaimer, the term of this patent is extended or adjusted under 35 U.S.C. 154(b) by 425 days.

(21) Appl. No.: 17/334,323

(22) Filed: May 28, 2021

(65) Prior Publication Data

US 2022/0378251 A1 Dec. 1, 2022

(51) Int. Cl.
*A47J 45/06* (2006.01)
*A47J 31/30* (2006.01)
*A47J 31/44* (2006.01)

(52) U.S. Cl.
CPC .......... *A47J 45/067* (2013.01); *A47J 31/303* (2013.01); *A47J 31/4403* (2013.01)

(58) Field of Classification Search
CPC combination set(s) only.
See application file for complete search history.

(56) References Cited

U.S. PATENT DOCUMENTS

| | | | |
|---|---|---|---|
| 1,480,356 A | 1/1924 | Wegener | |
| 1,546,131 A * | 7/1925 | Hechler | A47J 45/067 220/753 |
| 1,579,489 A | 4/1926 | Rau | |
| 2,069,037 A | 1/1937 | Jedlicka | |
| 2,169,239 A | 8/1939 | Hacmac | |
| 2,807,944 A | 10/1957 | Glass | |
| 4,491,040 A * | 1/1985 | Corona | A47J 31/4435 81/3.39 |
| 5,761,987 A | 6/1998 | Leon | |
| D399,384 S | 10/1998 | Ranzoni | |
| 5,823,385 A | 10/1998 | Cautereels | |
| 5,894,785 A | 4/1999 | Molinari | |
| D413,480 S | 9/1999 | Joergensen | |
| 6,220,477 B1 | 4/2001 | Schneider | |
| 6,332,557 B1 | 12/2001 | Moran | |
| D640,085 S | 6/2011 | Appleton | |
| D644,866 S | 9/2011 | Munro | |
| 8,950,621 B2 | 2/2015 | Hinzman | |
| D878,135 S | 3/2020 | Bodum | |
| 2020/0214490 A1 * | 7/2020 | Huang | A47J 31/3633 |

* cited by examiner

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

A moka pot includes a lower chamber, an upper chamber connected to the lower chamber, the upper chamber having a handle mount, and a handle. The handle has a first end pivotally attached to the handle mount and a second end spaced away from a side of the upper chamber. The handle is pivotable between a first position in which the handle extends along the side of the upper chamber and a second position in which the handle extends away from the upper chamber such that the second end of the handle is spaced further from the side of the upper chamber in the second position than in the first position.

17 Claims, 6 Drawing Sheets

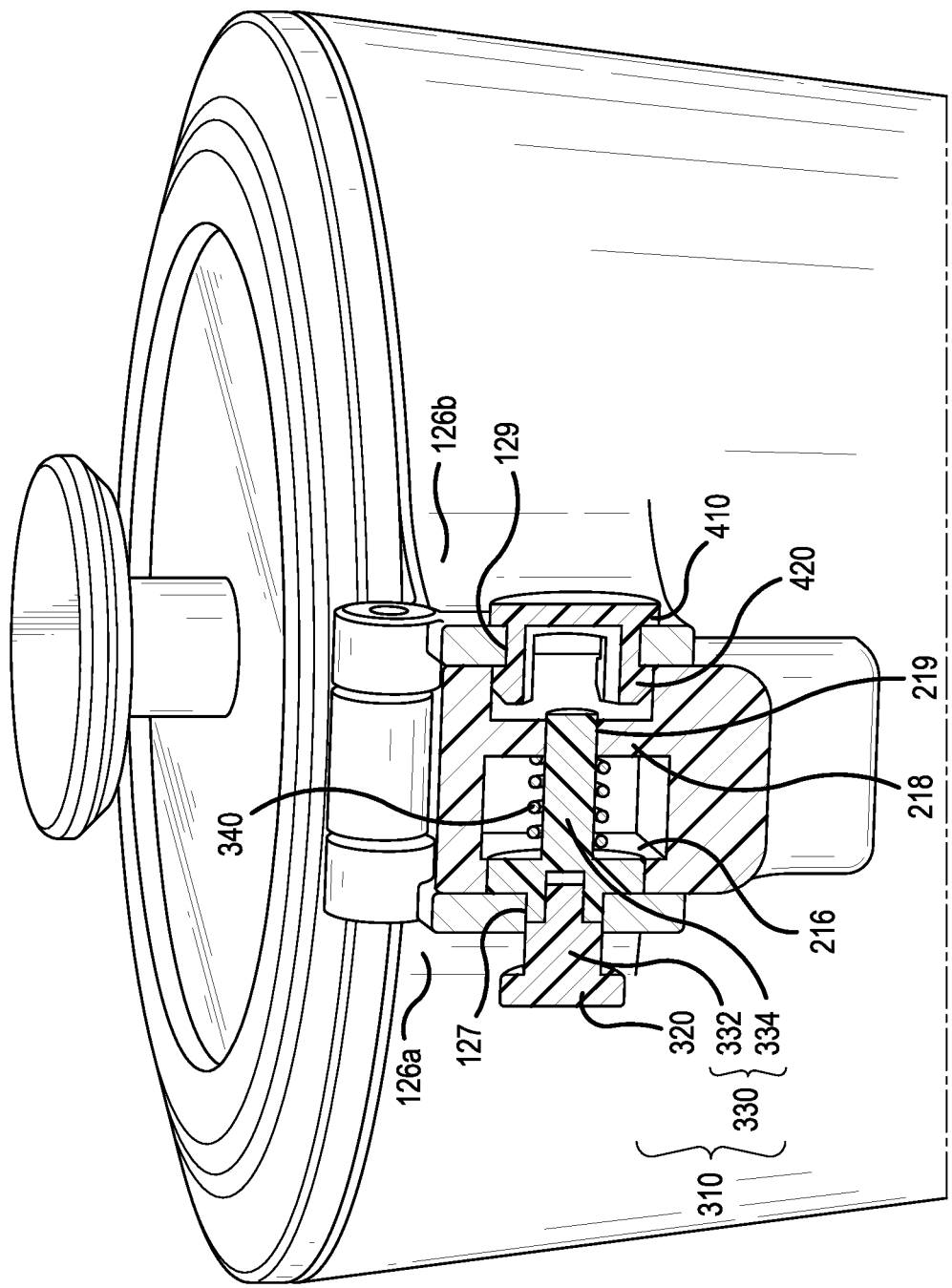

MOKA POT WITH PIVOTABLE HANDLE

BACKGROUND OF THE DISCLOSURE

1. Field of the Disclosure

The present disclosure is directed generally to a moka pot and, more particularly, to a moka pot with a pivotable handle.

2. Description of Related Art

Conventional moka pots can be used to brew coffee and other hot drinks. These moka pots typically have a lower chamber, an upper chamber, and a first funnel, filter or basket located between the lower chamber and the upper chamber to hold ground coffee or other dry products, and a second funnel to dispense coffee or the hot beverage into the upper chamber. The upper chamber has both a fixed handle and a pivotable lid attached at a same side of the upper chamber. An example of such moka pots can be found in U.S. Pat. No. 5,894,785, which is hereby expressly incorporated by reference.

Generally, a moka pot is placed on a burner of a stove-top to generate steam in the lower chamber, which causes an increase in vapor pressure in the lower chamber. Then, hot water is forced out of the lower chamber via the funnel, filter, or basket and through the ground coffee or other dry products. In turn, the coffee or other hot beverage flows into the upper chamber through another funnel.

Because the handle is fixed to the upper chamber, a free end of the handle spaced from the upper container is exposed to the same heat that is used to generate the steam in the lower chamber. This can cause the handle to become uncomfortable to grasp by the user.

BRIEF SUMMARY OF THE DISCLOSURE

Accordingly, an object of the present disclosure is to address drawbacks in the handle arrangement of conventional moka pots by allowing the free end of the handle to be pivoted away from the upper chamber when the moka pot is being heated.

To achieve this and other advantages and in accordance with the purpose of the present disclosure, as embodied and broadly described herein, in one aspect, a moka pot is provided that may include a lower chamber, an upper chamber located above the lower chamber, the upper chamber having a handle mount, and a handle having a first end pivotally attached to the handle mount and a second end spaced away from a side of the upper chamber. The handle may be pivotable between a first position in which the handle extends along the side of the upper chamber and a second position in which the handle extends away from the upper chamber such that the second end of the handle is spaced further from the side of the upper chamber in the second position than in the first position.

In another aspect, the moka pot may include a lock mechanism to selectively lock the handle in the first position and the second position.

In a further aspect, the handle mount may include a first handle support and a second handle support spaced from the first handle support, the first end of the handle being located between the first handle support and the second handle support. The lock mechanism may include a button member extending through the first handle support and into the handle.

In still a further aspect, the button member may include a button head, a shaft extending from the button head, and at least one protrusion extending in a radial direction away from the shaft. The first handle support may have a first through-hole to receive the shaft of the button member. The first end of the handle may include a first handle through-hole with at least two recesses extending radially therefrom. At least one protrusion of the shaft may be selectively positionable in the at least two recesses to selectively lock the handle in the first position and the second position.

In yet a further aspect, the at least one protrusion may include a first pair of protrusions and a second pair of protrusions arranged opposite the first pair of protrusions on the shaft. The at least two recesses may include a first group of three recesses and a second group of three recesses arranged on opposite sides of the first handle through-hole.

In another aspect, the shaft of the button member may include a first shaft portion extending from the button head and a second shaft portion connected to the first shaft portion. The second shaft portion may have a base and the first and second pairs of protrusions extending therefrom.

In a further aspect, the first shaft portion may have at least one flat edge in cross-section and the first through-hole of the first handle support may have at least one flat edge to prevent rotation of the button member in the first through-hole. The first shaft portion may have a substantially rectangular cross-section.

In a further aspect, the handle may include a first wall having the first handle through-hole, a second wall spaced apart from the first wall to define a receiving space, and a biasing member extending between the base of the second shaft portion and the second wall in the receiving space. The biasing member may be a coil spring.

In still a further aspect, the second wall may have a through-hole and an end of the second shaft portion opposite the base may be supported by the through-hole in the second wall.

In yet another aspect, the moka pot may include a retainer extending through the second handle support into the handle.

In a further aspect, the second handle support may include a second through-hole. The retainer may include a pair of pawls that engage the second through-hole.

Further scope of applicability of the present application will become more apparent from the detailed description given hereinafter. However, it should be understood that the detailed description and specific examples, while indicating preferred embodiments of the present disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings:

FIG. 5 is a partial cut-away view of the handle and lock mechanism of the moka pot of FIG. 1;

DETAILED DESCRIPTION OF THE DISCLOSURE

Figure 1:
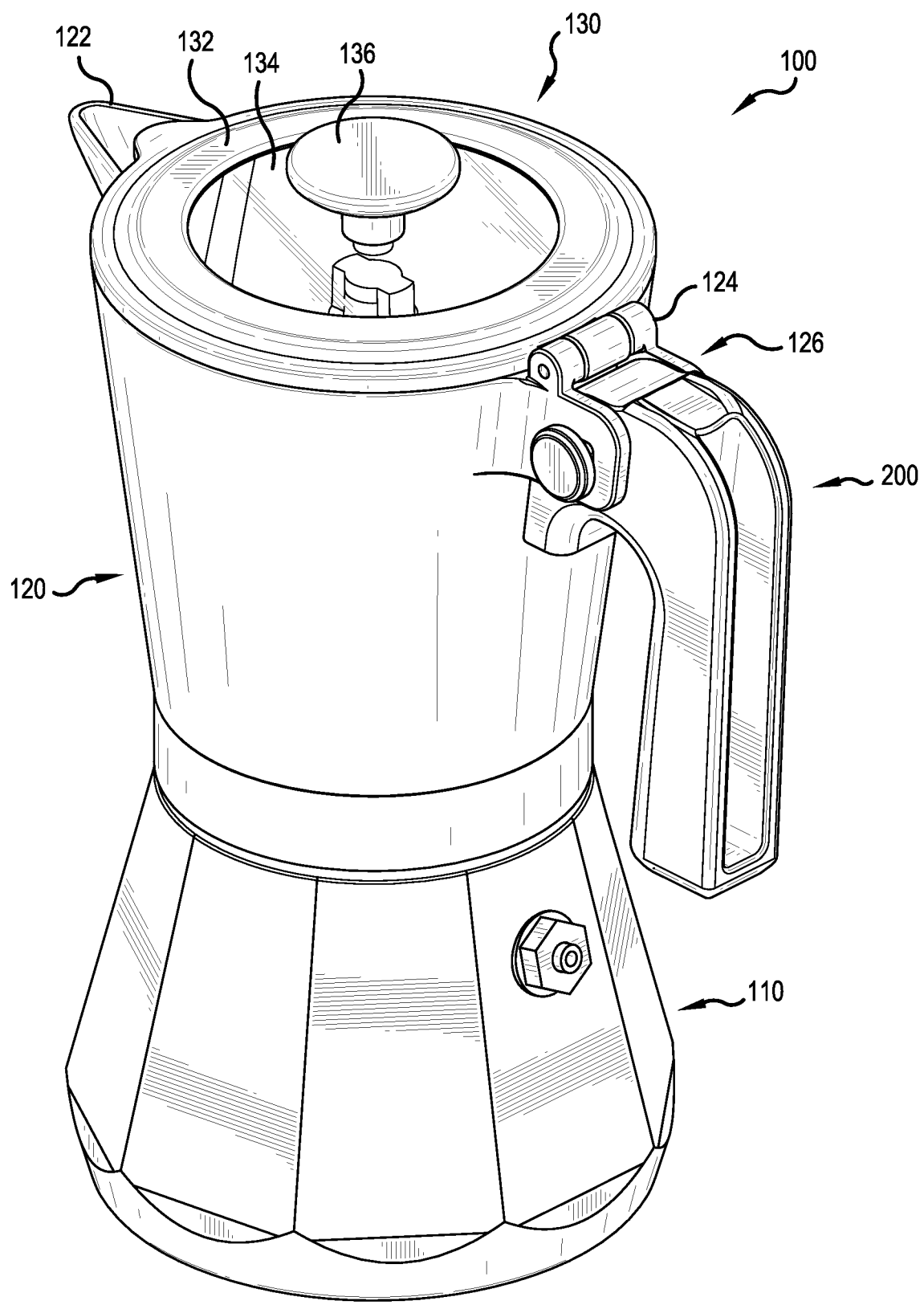
FIG. 1 is a perspective view of a moka pot according to an exemplary embodiment of the present disclosure.
Figure 2:
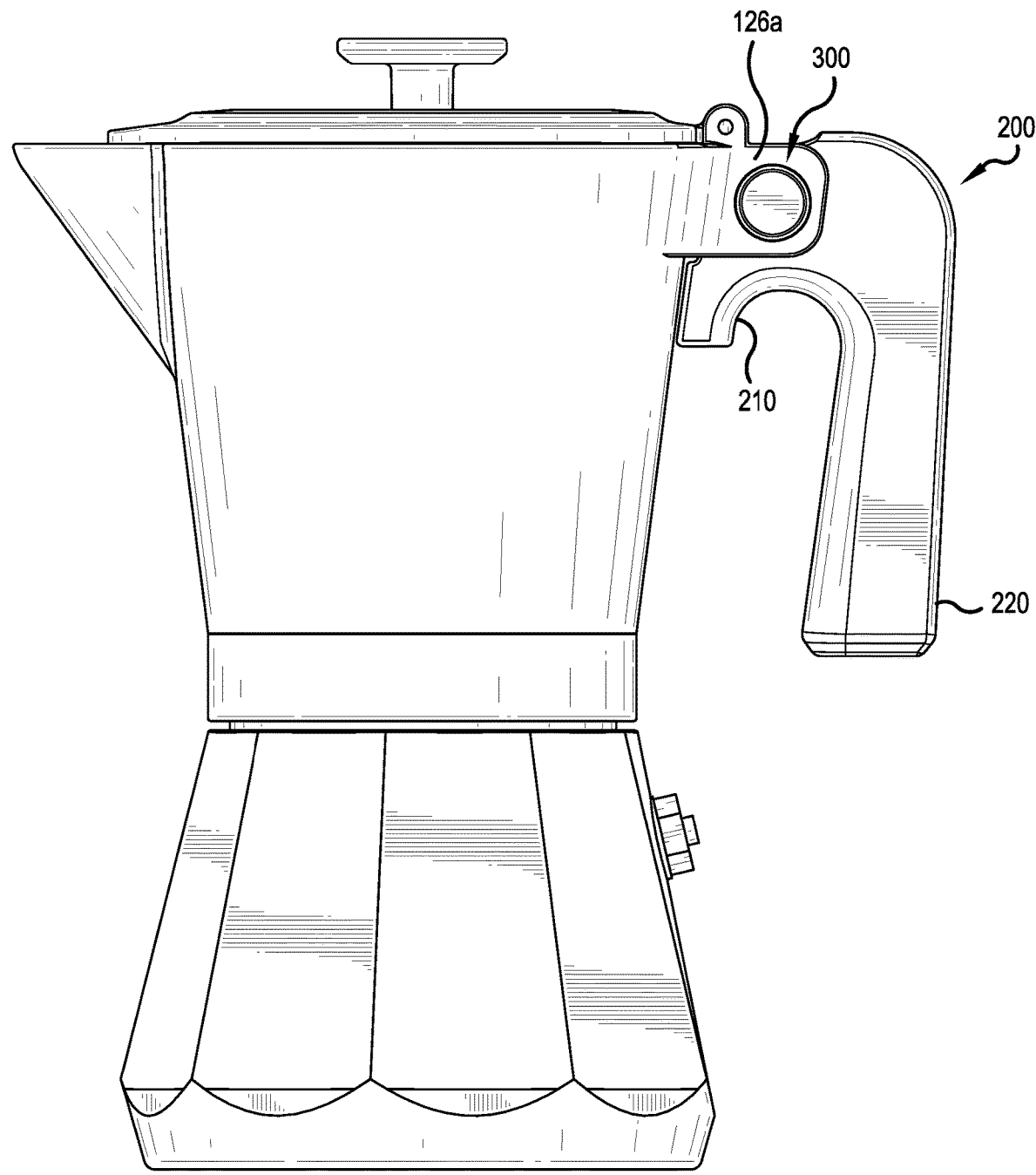
FIG. 2 is an elevation view of the moka pot of FIG. 1 with the handle in a first position.
Figure 3:
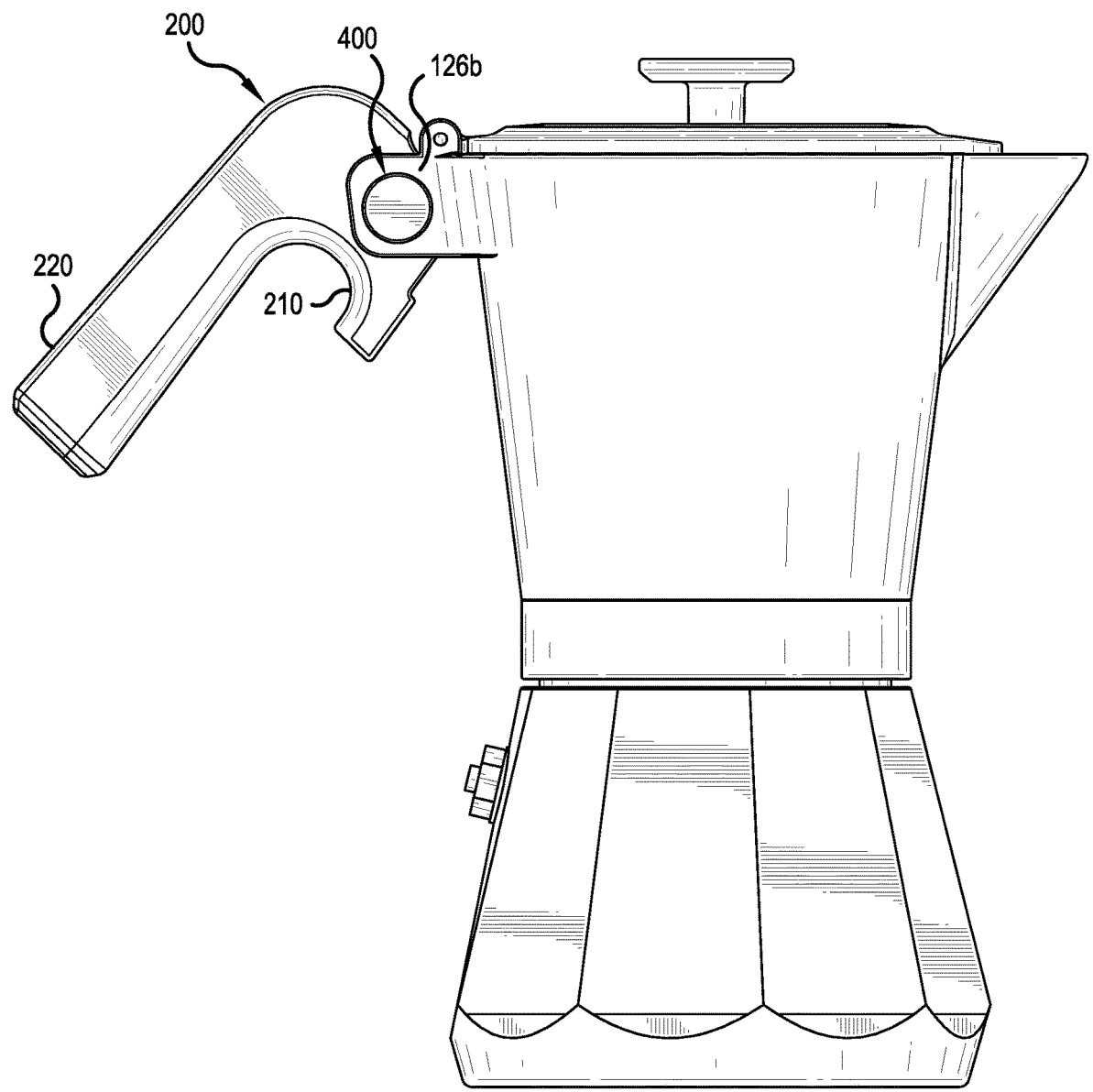
FIG. 3 is another elevation view of the moka pot of FIG. 1 with the handle in a second position.
Figure 4:
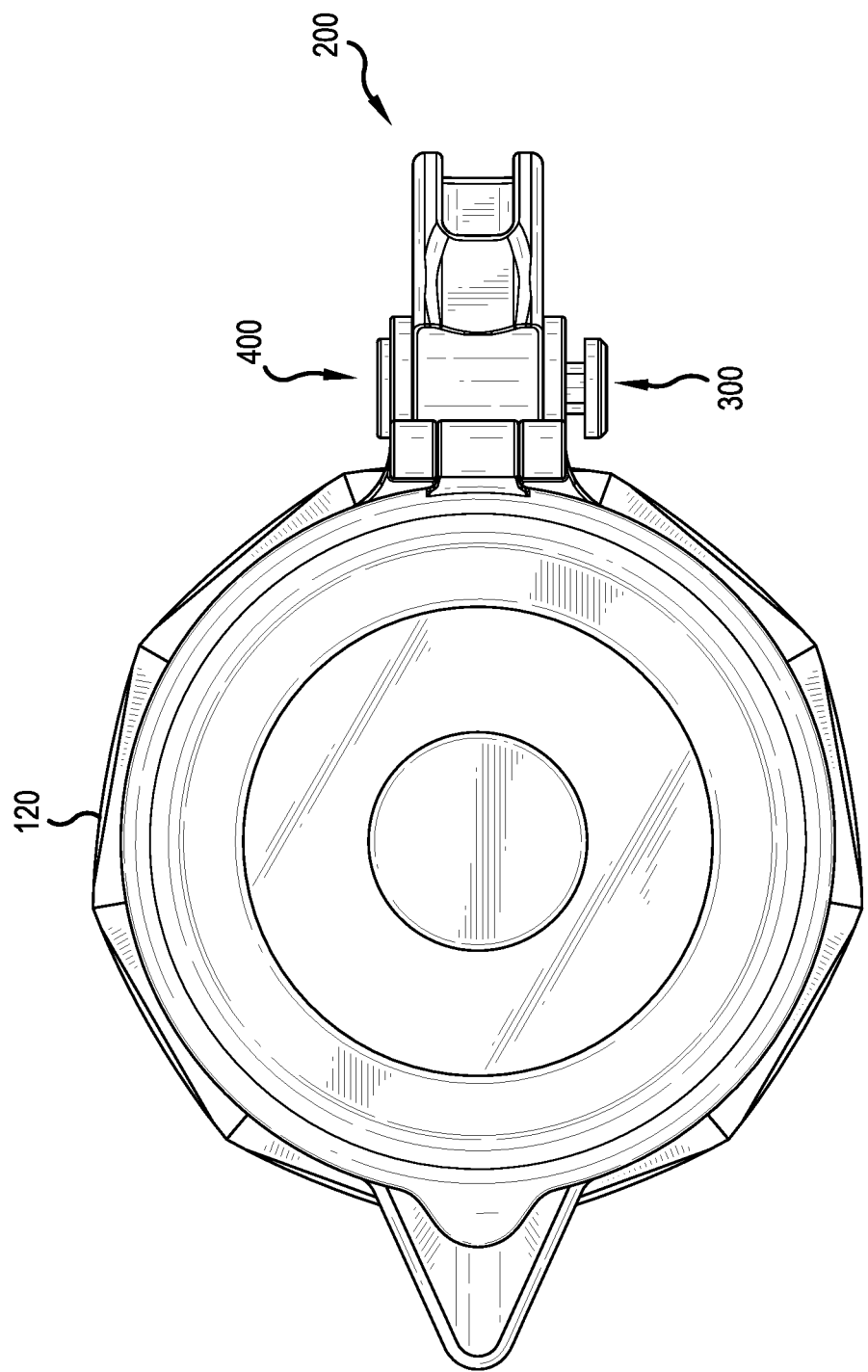
FIG. 4 is a plan view of the moka pot of FIG. 1.

Referring now in detail to the drawings for the purposes of illustrating an exemplary embodiment of the present disclosure, a moka pot 100 is shown in FIGS. 1-4. The moka pot 100 includes a lower chamber or boiler 110, an upper chamber or collecting chamber 120 located above the lower chamber 110, a lid 130, and a handle 200. The upper chamber 120 includes a pouring spout 122, a hinge 124 connecting the lid 130 to the upper chamber 120 and a handle mount 126. The lower chamber 110 and upper chamber 120 may be made of metal, such as, but not limited to, polished aluminum. The lid 130 may include a metal rim 132, a glass portion 134, and a top 136. The top 136 and handle 200 may be made of polymer material, such as, but not limited to, Bakelite™.

The handle 200 has a first end 210 pivotally attached to the handle mount 126 and a second end 220 spaced away from a side of the upper chamber 120. The handle is pivotable between a first position (FIGS. 1 and 2) in which the handle 200 extends along the side of the upper chamber 120 and a second position (FIG. 3) in which the handle 200 extends away from the upper chamber 120 such that the second end 220 of the handle 200 is spaced further from the side of the upper chamber 120 in the second position than in the first position.

The handle mount 126 includes a first handle support 126a and a second handle support 126b spaced from the first handle support 126a. The first end 210 of the handle 200 is located between the first handle support 126a and the second handle support 126b.

The moka pot 100 includes a locking mechanism 300 to selectively lock the handle 200 in the first position and the second position. The locking mechanism 300 includes a button member 310 extending through the first handle support 126a and into the handle 200. The moka pot 100 also includes a retainer 400 extending through the second handle support 126b into the handle 200. The combination of the button member 310 and the retainer 400 connect the handle 200 to the handle mount 126.

Figure 6A:
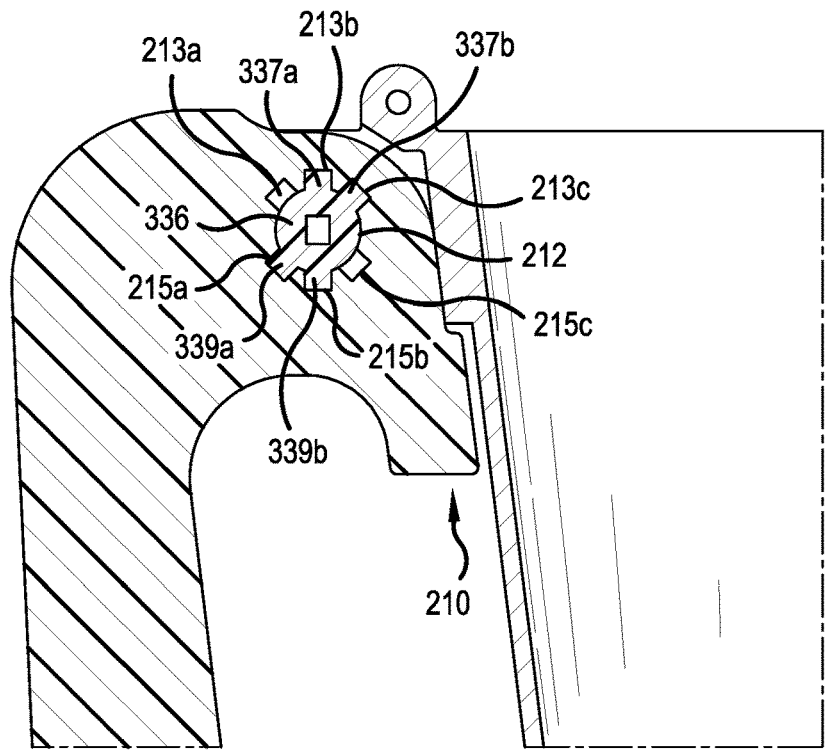
FIG. 6A is a schematic view showing the lock mechanism and handle of the moka pot of FIG. 1 in the first position.
Figure 6B:
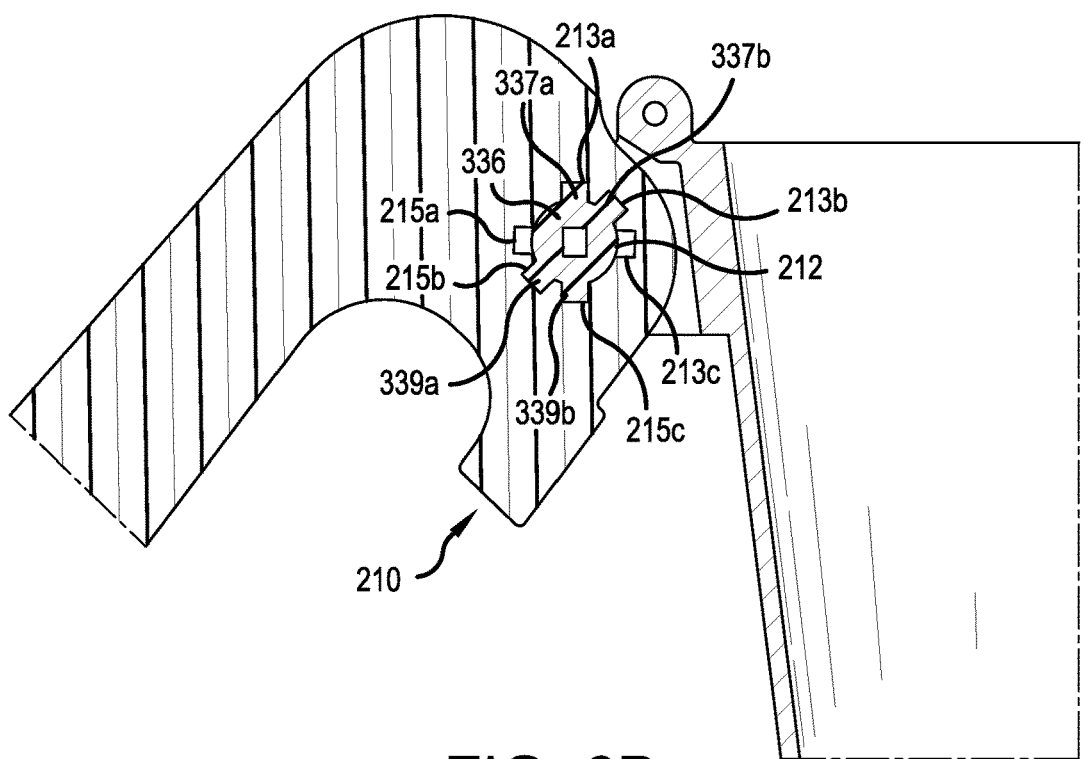
FIG. 6B is a schematic view showing the lock mechanism and handle of the moka pot of FIG. 1 in the second position.

FIGS. 5, 6A and 6B show various components of the handle mount 126, handle 200, locking mechanism 300, and retainer 400. The button member 310 includes a button head 320 and a shaft 330 extending from the button head 320. The first handle support 126a has a first through-hole 127 to receive the shaft 330 of the button member 310.

In this arrangement, the shaft 330 may include a first shaft portion 332 and a second shaft portion 334 connected to the first shaft portion 332. The first shaft portion 332 may have at least one flat edge in cross-section and the first through-hole 127 of the first handle support 126a may have at least one flat edge to prevent rotation of the button member 310 in the first through-hole 127. For example, the first shaft portion 332 may have a substantially rectangular cross-section which allows for movement of the button member 310 along an axis defined by the first shaft portion 332 as opposed to rotating about the axis defined by the first shaft portion 332. The second shaft portion 334 may include a base 336 and a first pair of protrusions 337a, 337b and a second pair of protrusion 339a, 339b extending radially away from the base 336. The button head 320 and first shaft portion 332 may be made of a polymer material, such as, but not limited to, Nylon. The second shaft portion 334 may be made of metal, such as, but not limited to, zinc alloy.

The first end 210 of the handle 200 includes a first handle through-hole 212 with a first group of three recesses 213a, 213b, and 213c and a second group of three recesses 215a, 215b, 215c arranged on opposite sides of the first handle through-hole 212 and in communication with the first handle through-hole 212. As best seen in FIGS. 6A and 6B, the first pair of protrusions 337a, 337b are selectively positionable in the first group of three recess 213a-213c and the second pair of protrusions 339a, 339b, are selectively positionable in the second group of three recesses 215a-215c to lock the handle in the first position or the second position.

The first end 210 of the handle 200 has a first wall 216, which includes the first handle through-hole 212 and a second wall 218 spaced apart from the first wall 216 to define a receiving space. The second wall 218 has a second handle through-hole 219 to receive an end of the second shaft portion 334 opposite the base 336 to support the end of the second shaft portion 334 and guide movement of the button member 310 along the axis thereof.

The locking mechanism 300 includes a biasing member 340 extending between the base 336 of the second shaft portion 334 and the second wall 218 in the receiving space. The biasing member 340 may be a coil spring or other suitable spring that biases the base 336 away from the second wall 218 to maintain engagement of the pairs of protrusions in the recesses. The biasing member may be made of a metal, such as, but not limited to steel.

The retainer 400 includes a retainer head 410 and a pair of pawls 420. The second handle support 126b has a second through-hole 129 that cooperates with the pair of pawls 420 to support a side of the first end 210 of the handle 200 opposite the first wall 216 to allow for pivoting of the handle 200. The retainer may be made of a polymer material, such as, but not limited to, ABS.

When the handle 200 is in the first position, the first pair of protrusions 337a, 337b are located in recesses 213b, 213c and the second pair of protrusions 339a, 339b are located in recesses 215a, 215b. In order to move the handle 200 to the second position, a user pushes the button head 320 inwards against the biasing force of the biasing member 340, thereby moving the base 336 towards the second wall 218. This causes the first pair of protrusions 337a, 337b to move out of recesses 213b, 213c and the second pair of protrusions 339a, 339b to move out of recesses 215a, 215b. The handle 200 can then be moved to the second position. Once the user releases the button head 320, biasing member 340 moves the base 336 away from the second wall 218. This causes the first pair of protrusions 337a, 337b to be moved into recess 213a, 213b and the second pair of protrusion 339a, 339b to be moved into recesses 215b, 215c. By reversing the process, the handle 200 can be moved from the second position to the first position.

The user can vary the position of the handle 200 depending on whether the moka pot is being placed on a burner of a stove-top, lifted from the burner of a stove-top, or storing the moka pot in a cabinet, sink, or dishwasher.

While pairs of protrusions are shown, it is understood that the number of protrusions can vary so long as a sufficient number of recesses are provided to allow for selective placement of the handle. For example, if one protrusion is provided, then at least two recesses will be necessary.

The moka pot thus being described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A moka pot, comprising:
a lower chamber;
an upper chamber located above the lower chamber, the upper chamber having a handle mount;
a handle, the handle having a first end pivotally attached to the handle mount and a second end spaced away from a side of the upper chamber, the handle being pivotable between a first position in which the handle extends along the side of the upper chamber and a second position in which the handle extends away from the upper chamber such that the second end of the handle is spaced further from the side of the upper chamber in the second position than in the first position; and
a lock mechanism located at the first end of the handle to selectively lock the handle in the first position and the second position.

2. The moka pot according to claim 1, wherein the handle mount includes a first handle support and a second handle support spaced from the first handle support, the first end of the handle being located between the first handle support and the second handle support, and
wherein the lock mechanism includes a button member extending through the first handle support and into the handle.

3. The moka pot according to claim 2, wherein the button member includes:
a button head;
a shaft extending from the button head; and
at least one protrusion extending in a radial direction away from the shaft.

4. The moka pot according to claim 3, wherein the first handle support has a first through-hole to receive the shaft of the button member,
wherein the first end of the handle includes a first handle through-hole with at least two recesses extending radially therefrom, and
wherein the at least one protrusion of the shaft is selectively positionable in the at least two recesses to selectively lock the handle in the first position and the second position.

5. The moka pot according to claim 4, wherein the at least one protrusion includes a first pair of protrusions and a second pair of protrusions arranged opposite the first pair of protrusions on the shaft, and
wherein the at least two recesses include a first group of three recesses and a second group of three recesses arranged on opposite sides of the first handle through-hole.

6. The moka pot according to claim 5, wherein the shaft of the button member includes:

a first shaft portion extending from the button head; and
a second shaft portion connected to the first shaft portion, the second shaft portion having a base and the first and second pairs of protrusions extending therefrom.

7. The moka pot according to claim 6, wherein the handle includes:
a first wall having the first handle through-hole;
a second wall spaced apart from the first wall to define a receiving space; and
a biasing member extending between the base of the second shaft portion and the second wall in the receiving space.

8. The moka pot according to claim 7, wherein the biasing member is a coil spring.

9. The moka pot according to claim 7, wherein the second wall has a through-hole, and
wherein an end of the second shaft portion opposite the base is supported by the through-hole in the second wall.

10. The moka pot according to claim 9, further comprising a retainer extending through the second handle support into the handle.

11. The moka pot according to claim 4, wherein the shaft of the button member includes:
a first shaft portion extending from the button head; and
a second shaft portion connected to the first shaft portion, the second shaft portion having a base and the at least one protrusion extending therefrom.

12. The moka pot according to claim 11, wherein the handle includes:
a first wall having the first handle through-hole;
a second wall spaced apart from the first wall to define a receiving space; and
a biasing member extending between the base of the second shaft portion and the second wall in the receiving space.

13. The moka pot according to claim 12, wherein the second wall has a through-hole, and
wherein an end of the second shaft portion opposite the base is supported by the through-hole in the second wall.

14. The moka pot according to claim 11, wherein the first shaft portion has at least one flat edge in cross-section, and
wherein the first through-hole of the first handle support has at least one flat edge to prevent rotation of the button member in the first through-hole.

15. The moka pot according to claim 14, wherein the first shaft portion has a rectangular cross-section.

16. The moka pot according to claim 2, further comprising a retainer extending through the second handle support into the handle.

17. The moka pot according to claim 16, wherein the second handle support includes a second through-hole, and
wherein the retainer includes a pair of pawls engaging the second through-hole.

* * * * *